June 18, 1935.  E. STUDT  2,005,273
SUBMARINE SIGNALING CABLE
Filed Sept. 25, 1933
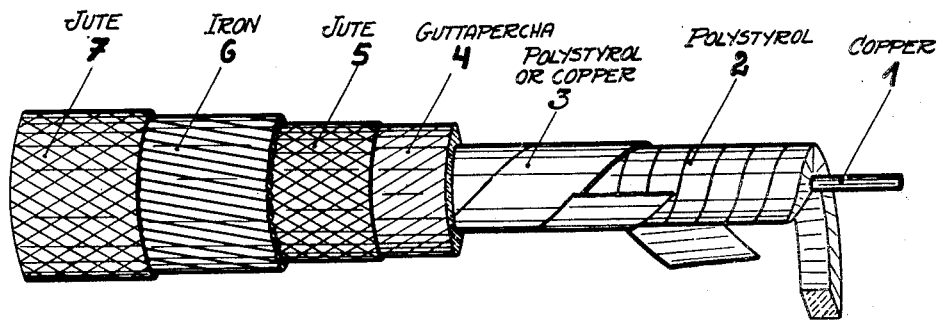
E. Studt INVENTOR
By Marks & Clerk ATTYS Patented June 18, 1935

2,005,273

UNITED STATES PATENT OFFICE 2,005,273

SUBMARINE SIGNALING CABLE

Ernst Studt, Nordenham, Germany, assignor to Norddeutsche Seekabelwerke A.-G., Nordenham, Germany Application September 25, 1933, Serial No. 690,957
In Germany October 24, 1932

5 Claims. (Cl. 173—266)

This invention relates to deep sea signaling cables, the conductors of which are surrounded with a solid non-compressible insulating layer of polystyrol.

Polystyrol which, owing to its good electrical properties, is especially suitable for the insulation of telephone conductors, cannot be used as a closed layer on the conductor, since it is only slightly flexible and too brittle. However, as it has now become possible to form polystyrol into bands and threads by using a special process, it is proposed, according to the present invention, to wind profiled bands of polystyrol on the conductor in such a manner that the turns thereof shall abut closely against one another. The expression "profiled' is intended to mean cross-sections which are not of circular form. The profiled cords or bands may, for instance, have a square or trapezoidal cross section, it being however understood that other forms of cross section may be used instead. Generally a single band wound round the copper conductor, as is indicated in the drawing, is sufficient.

Further a band winding of thin bands, for instance, of polystyrol is provided over the said closed layer, in order to cover any gaps which may be produced in the insulation by a bending of the conductor. Instead of a band winding, use may be made, in the case of single core cables, of a copper band serving as a return conductor, which is wound over the insulating layer consisting of profile bands. In the manufacture of a single-core deep sea cable there is preferably provided over the insulated conductor, constructed according to the invention, a watertight sheathing of guttapercha or guttapercha-like material, over which an armouring may be laid in the usual way.

A plurality of insulated conductors according to the invention may be stranded together and the spaces between the conductors be filled by means of profiled strands of a sprayable material, for instance of guttapercha or mixtures of polystyrol with guttapercha and like substances, a watertight sheathing being placed thereon in the usual way.

The accompanying drawing illustrates, by way of example, one form of construction according to the invention. The conductor 1 is wound with a profiled strand 2 of polystyrol of approximately square cross section, in such a maner that a gapless layer of polystyrol is formed. Over this insulating layer there is placed a band winding 3 consisting of two flat bands of polystyrol. A watertight guttapercha covering 4 is placed thereon, which guttapercha covering is surrounded in a known manner by a layer 5 of jute, a round wire armouring 6 and a further layer 7 of jute. Instead of the band winding 3 of polystyrol use may be made of metal bands used as a return conductor.

What I claim is:—

1. An electric deep sea cable comprising a cable core consisting of an electric conductor, an insulating profiled band of polystyrol wound on the said conductor, the turns of which band winding abut against one another and a closed winding of thin bands on the said profiled band winding, a watertight sheathing around the said cable core, and an armouring around the said watertight sheathing.

2. An electric deep sea cable comprising a cable core consisting of an electric conductor, an insulating profiled band of polystyrol wound on the said conductor, the turns of which band winding abut against one another and a closed winding of thin bands of polystyrol on the said profiled band winding, serving as a further insulation, a watertight sheathing around the said cable core, and an armouring around the said watertight sheathing.

3. An electric deep sea cable comprising a cable core consisting of an electric conductor, an insulating profiled band of polystyrol wound on the said conductor, the turns of which band winding abut against one another and a closed winding of thin bands of copper on the said profiled band winding, a watertight sheathing around the said cable core, and an armouring around the said watertight sheathing.

4. An electric deep sea cable as claimed in claim 1, in which the watertight sheathing consists of a thermoplastic material.

5. An electric deep sea cable as claimed in claim 1, in which the watertight sheathing consists of guttapercha.

ERNST STUDT.